US012002430B2

(12) United States Patent
Okada

(10) Patent No.: US 12,002,430 B2
(45) Date of Patent: Jun. 4, 2024

(54) DISPLAY DEVICE AND DISPLAY CONTROL METHOD

(71) Applicant: Alps Alpine Co., LTD., Tokyo (JP)

(72) Inventor: Hiroki Okada, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/139,052

(22) Filed: Apr. 25, 2023

(65) Prior Publication Data

US 2023/0386416 A1 Nov. 30, 2023

(30) Foreign Application Priority Data

May 12, 2022 (JP) ................................ 2022-078960

(51) Int. Cl.
*G09G 3/34* (2006.01)

(52) U.S. Cl.
CPC ..... *G09G 3/3406* (2013.01); *G09G 2310/061* (2013.01); *G09G 2310/08* (2013.01); *G09G 2320/0247* (2013.01); *G09G 2320/0693* (2013.01)

(58) Field of Classification Search
CPC ........ G09G 5/397; G09G 5/026; G09G 5/003; G09G 3/3406; G09G 2310/061; G09G 2310/08; G09G 2320/0247; G09G 2320/0693; G09G 5/14; G09G 5/00; G09G 3/34; G09G 3/20
See application file for complete search history.

(56) References Cited

U.S. PATENT DOCUMENTS

2011/0298977 A1* 12/2011 Sekiguchi .............. H04N 7/012 348/E7.003
2019/0051270 A1* 2/2019 Tsuchida ................ G09G 5/026

FOREIGN PATENT DOCUMENTS

| | | |
|---|---|---|
| EP | 1 613 068 A1 | 1/2006 |
| JP | 2003-062818 | 9/2004 |
| JP | 2008-212632 | 3/2010 |

OTHER PUBLICATIONS

Extended European Search Report issued Jul. 21, 2023 in corresponding European Patent Application No. 23170943.7.

* cited by examiner

*Primary Examiner* — Michael A Faragalla
(74) *Attorney, Agent, or Firm* — Crowell & Moring LLP

(57) ABSTRACT

One form of a display device includes: an on-screen display (OSD) video generation unit configured to execute synchronization processing of synchronizing an OSD video with a synchronization signal of an external video while outputting the OSD video when the external video and the OSD video are displayed in a superimposed manner; and an external video processing unit configured not to output the external video during execution of the synchronization processing and to output the external video after completion of the synchronization processing. The videos are prevented from being distorted by not displaying the external video while displaying only the OSD video until the synchronization processing between the OSD video and the external video is completed, and flickering of the video is prevented by continuously displaying the OSD video and preventing a non-displayed black screen from being inserted at a moment when the videos are switched.

5 Claims, 5 Drawing Sheets

FIG. 2A OSD VIDEO
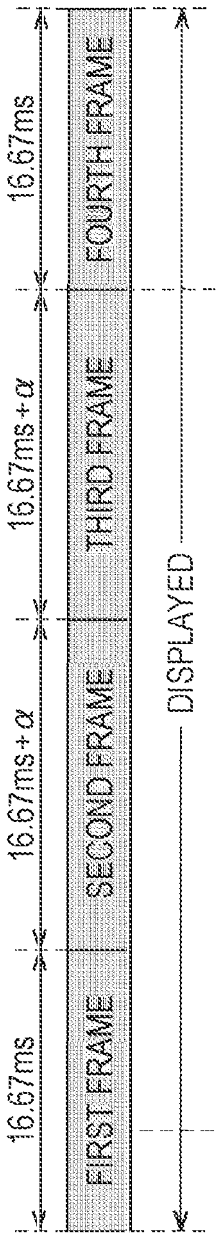
FIG. 2B EXTERNAL VIDEO
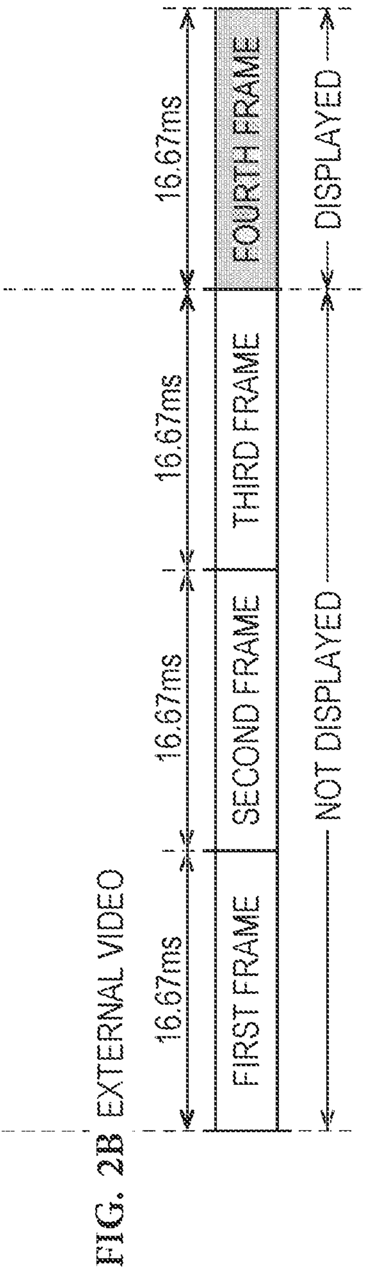

FIG. 3A OSD VIDEO

FIG 3B EXTERNAL VIDEO

DISPLAY DEVICE AND DISPLAY CONTROL METHOD

RELATED APPLICATION

The present application claims priority to Japanese Patent Application Number 2022-078960, filed May 12, 2022, the entirety of which is hereby incorporated by reference.

BACKGROUND

1. Field of the Disclosure

The present disclosure relates to a display device and a display control method, and particularly to a display device and a display control method which are suitably used for a display device having a function of displaying an external video and an OSD video in a superimposed manner.

2. Description of the Related Art

In the related art, a display device which displays a video input as video data from an external device (hereinafter, referred to as an external video) and has an on-screen display (OSD) function of displaying an internally generated video in a superimposed manner on the external video is known. In regard to the OSD function, JP 2004-274424 A describes a technique of displaying a list of information (names, states, and the like) regarding ICs connected to a microcomputer in response to an instruction. JP 2010-50690 A describes a technique of displaying various screens such as a replayed image selection screen as an OSD on a display monitor of a digital camera.

Recently, LCDs have been developed in meter clusters of in-vehicle devices. Various meters necessary for driving and also various warning lights are displayed on a cluster display. Display of warning lights is particularly important and is required to meet specific levels of functional safety. Therefore, it is desirable that all the warning lights be displayed right after a power source of the cluster display is turned on to indicate there is no functional loss (abnormalities).

However, a control unit that performs graphical display on the cluster display typically includes large-scale software mounted thereon. Accordingly, it takes time to process the video input from outside the display, and it is not possible to immediately perform the display. Thus, an OSD function is mounted on the cluster display to display a video of various meters and the like on the basis of video data input from an external device while a video of warning lights is generated and displayed by using an internal OSD function.

However, since the display of the external video input from outside of the display and the display of the video generated by using the OSD function inside the display (hereinafter, referred to as an OSD video) operate asynchronously, the videos may be distorted when the OSD video is displayed in a superimposed manner on the external video or when the external video and the OSD video are displayed by being switched between for each dot. In order to prevent this, a method of capturing the external video in a frame buffer (DRAM) and outputting the external video from the frame buffer in accordance with a synchronization signal of the OSD video has widely been performed. However, there is a problem that a cost of the device may increase due to utilization of the DRAM.

Also, a method of turning off a display (displaying a black screen) temporarily after displaying an OSD video such that distortion of the video does not appear when a superimposed video of an external video and an OSD video is displayed after the OSD video is displayed and is switched therefrom and during it, synchronizing display of the OSD video with a synchronization signal of the external video may be used. However, since the black screen is inserted at a moment after the OSD video of various warning lights is displayed as illustrated in FIG. 5, and the OSD video of various warning lights is then displayed again in the state where the external video of various meters is superimposed thereon in this case, there is a problem that screen appears to be flickering and video quality is degraded.

SUMMARY

The present disclosure was made in order to address such a problem, and an objective of the present disclosure is to prevent distortion and flickering of videos from occurring when a superimposed video of an external video and an OSD video is displayed after the OSD video is displayed and is then switched therefrom.

To address the above problem, synchronization processing of synchronizing an OSD video with a synchronization signal of an external video while displaying the OSD image is executed when the external video, which is a video input from the outside of a display device, and the OSD video generated inside the display device are displayed in a superimposed manner; the external video is not displayed during execution of the synchronization processing; and the external video and the OSD video are displayed in a superimposed manner after completion of the synchronization processing.

According to forms of the present disclosure configured as described above, since only the OSD video is displayed and the external video is not displayed until the synchronization processing between the OSD video and the external video is completed, distortion of the videos does not occur. Also, since a non-display black screen is not inserted at a moment at the time of switching from a state where only the OSD video is displayed to a state where the external video and the OSD video are displayed in a superimposed manner, flickering of the videos does not occur. In this manner, according to the present disclosure, it is possible to prevent distortion and flickering of videos from occurring when a superimposed video of an external video and an OSD video is displayed after the OSD video is displayed and is switched therefrom.

BRIEF DESCRIPTION OF THE DRAWINGS

FIGS. 2A to 2B are a schematic diagram for explaining an example of synchronization processing;

DETAILED DESCRIPTION

Figure 1:
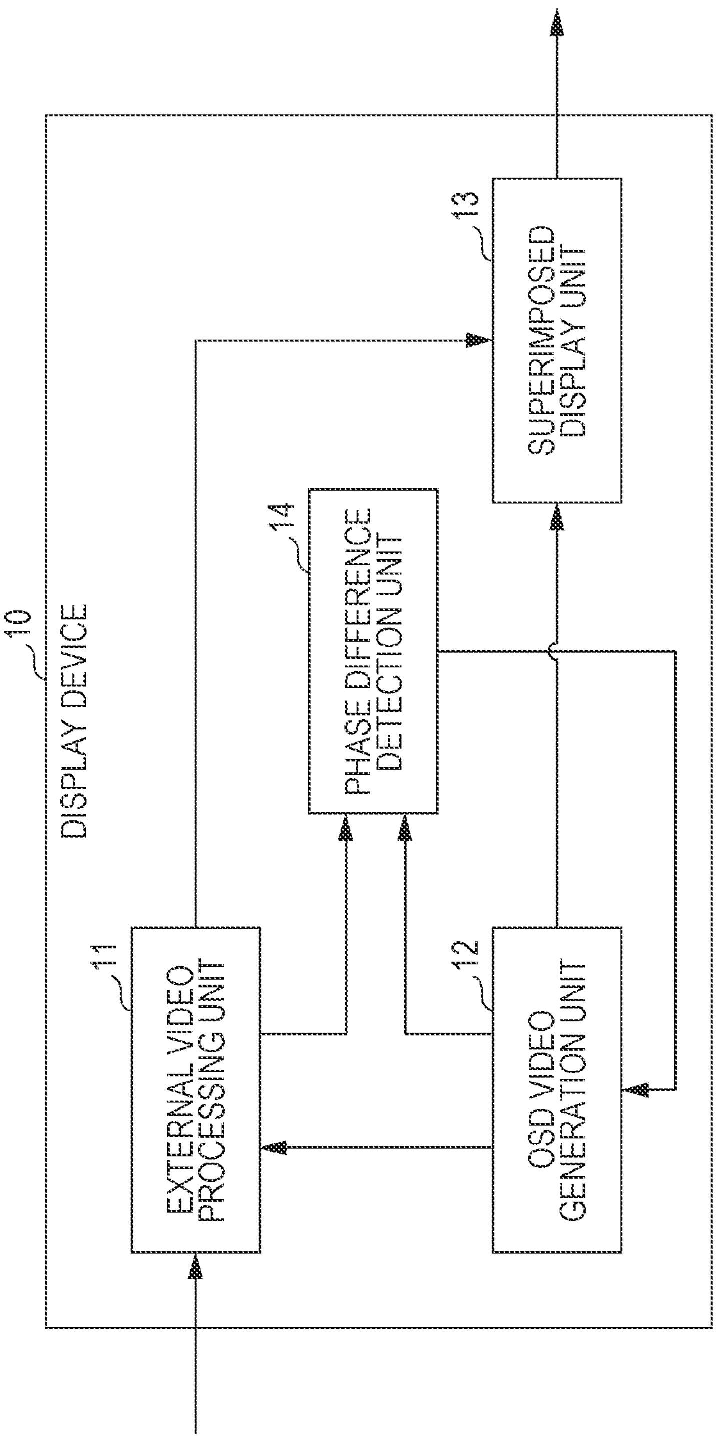
FIG. 1 is a block diagram illustrating one form of a functional configuration example of a display device.

Hereinafter, an embodiment of the present disclosure will be described on the basis of the drawings. FIG. 1 is a block diagram illustrating a functional configuration example of a display device 10 according to the present embodiment. As illustrated in FIG. 1, a display device 10 includes, as functional configurations, an external video processing unit 11, an on-screen display (OSD) video generation unit 12, a superimposed display unit 13, and a phase difference detection unit 14.

Each of these functional blocks 11 to 14 can be implemented by any of hardware, a digital signal processor (DSP), or software. In a case where the functional blocks 11 to 14 are implemented by software, each of the above functional blocks 11 to 14 practically includes, for example, a CPU, a RAM, a ROM, and the like of a computer, and is realized by a program stored in the RAM, the ROM or a storage medium such as a hard disk or a semiconductor memory being executed by the CPU.

The display device 10 according to the present embodiment is implemented as an in-vehicle cluster display with an OSD function mounted therein in an example and is adapted to display a video of various meters and the like on the basis of video data input from an external device while generating a video of warning lights by using an internal OSD function and displaying it.

The external video processing unit 11 performs predetermined processing in regard to the video (external video) of various meters and the like input as video data from the outside of the display device 10 and successively outputs it as frame video data for each frame to the superimposed display unit 13. The frame rate of the external video processed by the external video processing unit 11 is, for example, 60 fps. In other words, the time length of one frame is 16.67 ms. Note that the external video processing unit 11 does not output the external video to the superimposed display unit 13 when the OSD video generation unit 12 is performing synchronization processing, which will be described later.

The OSD video generation unit 12 generates the video of various warning lights (OSD video) inside the display device 10 by using the OSD function. The OSD video generation unit 12 successively outputs the generated video data as frame video data for each frame to the superimposed display unit 13.

The frame rate of the OSD video generated by the OSD video generation unit 12 is the same as the frame rate of the external video and is, for example, 60 fps. In other words, the time length of one frame is 16.67 ms. However, the OSD video generation unit 12 adjusts the frame time length when synchronization between the OSD video and the external video is performed for some of frames of the generated OSD video. Details of the adjustment will be described later.

The superimposed display unit 13 displays the external video processed by the external video processing unit 11 and the OSD video generated by the OSD video generation unit 12 in a superimposed manner. Note that in a case where the OSD video generation unit 12 has not output any OSD video, the superimposed display unit 13 displays only the external video output from the external video processing unit 11. On the other hand, in a case where the external video processing unit 11 has not output any external video, the superimposed display unit 13 displays only the OSD video output from the OSD video generation unit 12.

The external video and the OSD video have the same frame rate as each other as described above. Additionally, the external video and the OSD video also have mutually the same synchronization signal cycle and dot clock frequency. However, since the processing performed by the external video processing unit 11 and the processing performed by the OSD video generation unit 12 operate asynchronously, there may be deviation between the timing at which the external video is output from the external video processing unit 11 and the timing at which the OSD video is output from the OSD video generation unit 12. If the superimposed display unit 13 displays the external video and the OSD video output asynchronously in a superimposed manner as they are as described above, then the videos are distorted. Thus, processing for synchronizing the external video and the OSD video is performed.

In other words, the OSD video generation unit 12 executes synchronization processing of synchronizing the OSD video with a synchronization signal of the external video while outputting the OSD video to the superimposed display unit 13 when the external video and the OSD video are displayed in a superimposed manner. At this time, the external video processing unit 11 does not output the external video to the superimposed display unit 13 during execution of the synchronization processing by the OSD video generation unit 12 and outputs the external video to the superimposed display unit 13 after completion of the synchronization processing.

Here, the OSD video generation unit 12 executes the synchronization processing by adjusting the frame time lengths of some of the frames of the OSD video. Specifically, the OSD video generation unit 12 executes the synchronization processing by adjusting the length of the blanking period within an allowable time range that can be set as the blanking period. The allowable time that can be set as the blanking period is a value determined by the specification of the display device 10 such as an LCD and is set and stored in advance. The number of frames to be used for the synchronization processing and the amount of adjustment of the frame time length of each frame (the amount of adjustment of the length of the blanking period) can be calculated at the timing when the synchronization processing is started. Details of this will be described later.

FIGS. 2A to 2B are a schematic diagram for explaining an example of the synchronization processing. FIG. 2A illustrates an OSD video generated by the OSD video generation unit 12, and FIG. 2B illustrates an external video processed by the external video processing unit 11. In FIGS. 2A to 2B, each rectangle represents one frame. The frames with a color indicate frames output to the superimposed display unit 13 and serving as targets of display, and the frames with no color indicate frames that are not output to the superimposed display unit 13 and do not serve as a target of display.

As illustrated in FIGS. 2A to 2B, since the OSD video of various warning lights is generated in a short period of time by the OSD video generation unit 12 while the time required to process the external video of various meters by the external video processing unit 11 is relatively long, the first frame of the external video is generated with a delay with respect to the first frame of the OSD video. The example in FIGS. 2A to 2B illustrates a case where the delay of the external video with respect to the OSD video is less than 0.5 frame length, that is, the phase difference of the synchronization of the external video with respect to the OSD video is less than 180 degrees.

In this case, the external video processing unit 11 does not adjust the frame time length of the external video and does not output the external video to the superimposed display unit 13 from the first frame to the third frame at a timing at which the synchronization processing performed by the OSD video generation unit 12 is completed as illustrated in FIG. 2B. Then, the external video is output to the superimposed display unit 13 from the fourth frame after the synchronization processing is completed. In other words, although the external video processing unit 11 continuously generates the frame video data with an ordinary frame time length from the first frame, the external video is not output to the superimposed display unit 13 until the third frame at the timing at which the synchronization processing is completed, and the external video is output to the superimposed display unit 13 from the fourth frame.

On the other hand, the OSD video generation unit 12 continues to output the OSD video to the superimposed display unit 13 from the first frame as illustrated in FIG. 2A. The OSD video generation unit 12 sets the blanking period of the second frame and the third frame in the OSD video to be longer than the ordinary blanking period while outputting the OSD video in such a manner thereby to achieve synchronization with the synchronization signal of the external video at the end of the third frame. In the example in FIGS. 2A to 2B, synchronization is achieved at the end of the third frame of the OSD video and at the end of the third frame of the external video. In this manner, output to the superimposed display unit 13 is performed in a mutually synchronized state with an ordinary frame time length both from the fourth frame of the OSD video and from the fourth frame of the external video.

Figure 3:
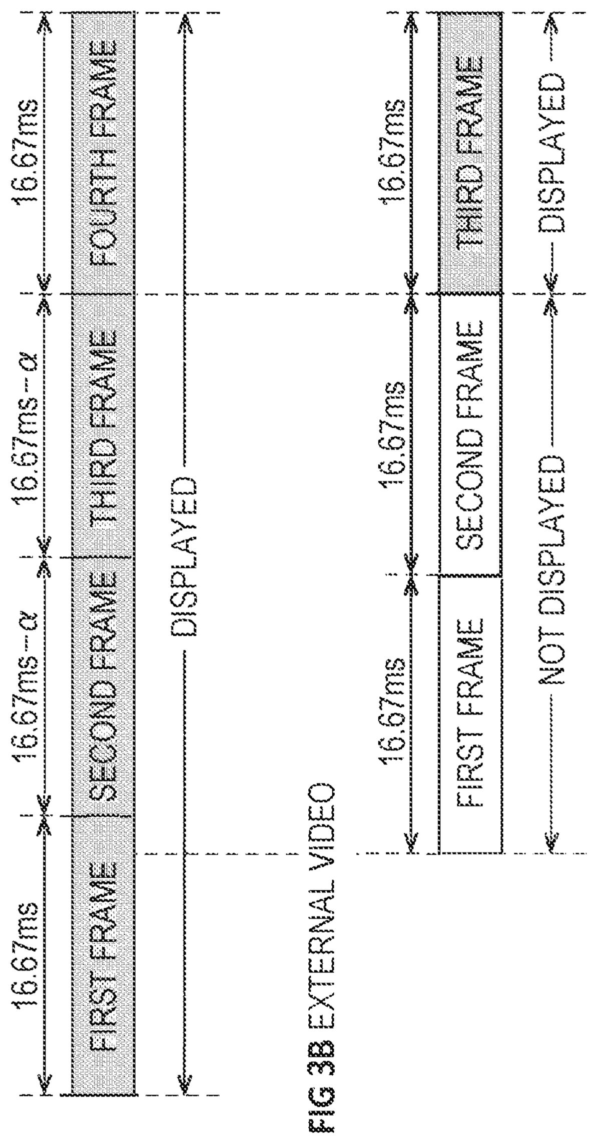
FIGS. 3A to 3B are a schematic diagram for explaining an example of the synchronization processing.

FIGS. 3A to 3B are a schematic diagram for explaining an example of synchronization processing in a case where the delay of the external video with respect to the OSD video is equal to or greater than 0.5 (the phase difference of the synchronization of the external video with respect to the OSD video is equal to or greater than 180 degrees). FIG. 3A illustrates an OSD video generated by the OSD video generation unit 12, and FIG. 3B illustrates an external video processed by the external video processing unit 11. In FIGS. 3A to 3B, the frames with a color indicate frames as targets of display, and the frames with no colors indicate the frames that are not targets of display, which are similar to FIGS. 2A to 2B.

In this case, the external video processing unit 11 does not adjust the frame time length of the external video and does not output the external video to the superimposed display unit 13 from the first frame to the second frame at a timing at which the synchronization processing performed by the OSD video generation unit 12 is completed as illustrated in FIG. 3B. Then, the external video is output to the superimposed display unit 13 from the third frame after the synchronization processing is completed. In other words, although the external video processing unit 11 continuously generates the frame video data with an ordinary frame time length from the first frame, the external video is not output to the superimposed display unit 13 until the second frame at the timing at which the synchronization processing is completed, and the external video is output to the superimposed display unit 13 from the third frame.

On the other hand, the OSD video generation unit 12 continues to output the OSD video to the superimposed display unit 13 from the first frame as illustrated in FIG. 3A. The OSD video generation unit 12 sets the blanking period of the second frame and the third frame in the OSD video to be shorter than the ordinary blanking period while outputting the OSD video in such a manner thereby to achieve synchronization with the synchronization signal of the external video at the end of the third frame. In the example in FIGS. 3A to 3B, synchronization is achieved at the end of the third frame of the OSD video and at the end of the second frame of the external video. In this manner, output to the superimposed display unit 13 is performed in a mutually synchronized state with an ordinary frame time length both from the fourth frame of the OSD video and from the third frame of the external video.

Here, the number of frames to be used for the synchronization processing and the amount of adjustment of the frame time length of each frame (the amount of adjustment of the length of the blanking period) will be described. The phase difference detection unit 14 is related to the description.

The phase difference detection unit 14 detects a phase difference between the external video generated through the processing performed by the external video processing unit 11 and the OSD video generated by the OSD video generation unit 12. For example, the phase difference detection unit 14 detects a phase difference between the external video and the OSD video by calculating a difference time between the timing at which generation of the frame video data of the first frame is completed for the external video input to the external video processing unit 11 and the timing at which generation of the frame video data of the first frame is completed for the OSD video generated by the OSD video generation unit 12.

Here, the OSD video generation unit 12 determines the amount of adjustment such that the blanking period of the OSD video becomes long as in FIG. 2A in a case where the phase difference detected by the phase difference detection unit 14 is less than 180 degrees, while the OSD video generation unit 12 determines the amount of adjustment such that the blanking period of the OSD video becomes short as in FIG. 3A in a case where the phase difference detected by the phase difference detection unit 14 is equal to or greater than 180 degrees. A method of determining the amount of adjustment and the number of frames to be used for the adjustment is as follows.

In other words, the OSD video generation unit 12 determines the amount of adjustment of the length of the blanking period per frame and the number of frames to be used for the adjustment on the basis of the allowable time that can be set as the blanking period and the difference in time corresponding to the phase difference detected by the phase difference detection unit 14. In some implementations, the OSD video generation unit 12 determines the amount of adjustment to minimize the number of frames to be used for the synchronization processing within the allowable time range.

For example, it is assumed that the minimum value (upper limit value) of the allowable time that can be set as the blanking period (a sum of the horizontal blanking periods and the vertical blanking periods of a plurality of videos) is 3 ms and the difference time detected by the phase difference detection unit 14 is 6 ms in the example in FIGS. 2A to 2B. In this case, since the difference time is longer than the allowable time by 3 ms, it is not possible to complete the synchronization processing only in one frame, and a plurality of frames are needed. Here, the synchronization processing is completed in two frames, which are the minimum number of frames, if the blanking period is extended by 3 ms in each of the second frame and the third frame.

Note that it is also possible to achieve the synchronization by extending the blanking period by 2 ms in each of three frames from the second frame to the fourth frame. Also, it is also possible to achieve the synchronization by extending the blanking period by 1 ms in each of six frames from the second frame to the seventh frame. However, the number of frames used for the adjustment is not minimum in these cases. On the other hand, the number of frames to be used for the adjustment and the amount of adjustment for each frame are preferably determined such that the synchronization processing is completed in two frames, which are the minimum number of frames, as in FIG. 2A.

Also, it is assumed that the minimum value (lower limit value) of the allowable time that can be set as the blanking period (a sum of the horizontal blanking periods and the vertical blanking periods of a plurality of videos) is 1 ms and the difference time detected by the phase difference detection unit 14 is 14.67 ms in the example in FIGS. 3A to 3B. In this case, since the difference between 16.67 ms which is the time length of one frame and 14.67 ms which is the difference time is longer than 1 ms which is the allowable time, it is not possible to complete the synchronization processing only in one frame, and a plurality of frames is needed. Here, the synchronization processing is completed in two frames, which are the minimum number of frames, if the blanking period is shortened by 1 ms in each of the second frame and the third frame. Therefore, the OSD video generation unit 12 determines the number of frames to be used for the adjustment and the amount of adjustment for each frame such that the synchronization processing is completed in two frames, which are the minimum number of frames, as in FIG. 3A.

The OSD video generation unit 12 notifies the external video processing unit 11 of the determined number of adjustment target frames and the phase difference (or the difference time) detected by the phase difference detection unit 14. In this manner, the external video processing unit 11 can calculate in which frame of the external video the synchronization processing performed by the OSD video generation unit 12 will be completed and can determine from which frame the external video is to be output to the superimposed display unit 13. In other words, determination can be made such that frames of the external video that are larger in number by one than adjustment target frames are brought into a non-output state in a case where the phase difference is less than 180 degrees, and the same number of frames as the number of adjustment target frames are brought into a non-output state in a case where the phase difference is equal to or greater than 180 degrees.

Note that although the case where the allowable time that can be set as the blanking period and the difference time detected by the phase difference detection unit 14 have a relationship of integral multiple has been described here for easiness of description, there may be other cases in practice. Therefore, it is not essential to set the same adjustment amount of the blanking periods for all the adjustment target frames. For example, a maximum value or a minimum value of the allowable time that can be set as the blanking period may be set for as many adjustment target frames as possible, and the amount of adjustment corresponding to the fraction may be set for the remaining adjustment target frames.

Additionally, the phase difference detection unit 14 may detect the phase difference between the external video and the OSD video in each of the horizontal direction and the vertical direction, and the OSD video generation unit 2 may determine the maximum value within the rage of the allowable time that can be set as the horizontal blanking period as the amount of adjustment of the length of the horizontal blanking period and may determine the amount of adjustment of the length of the vertical blanking period within the allowable time range that can be set as the vertical blanking period. It is thus possible to minimize the time required to complete the synchronization processing.

As described above in detail, the synchronization processing of synchronizing the OSD video with a synchronization signal of the external video is executed while displaying the OSD video when the external video, which is a video input from outside of the display device 10, and the OSD video generated inside the display device 10 are displayed in a superimposed manner, the external video is not displayed during execution of the synchronization processing, and the external video and the OSD video are displayed in a superimposed manner after completion of the synchronization processing in the present embodiment.

Figure 4:
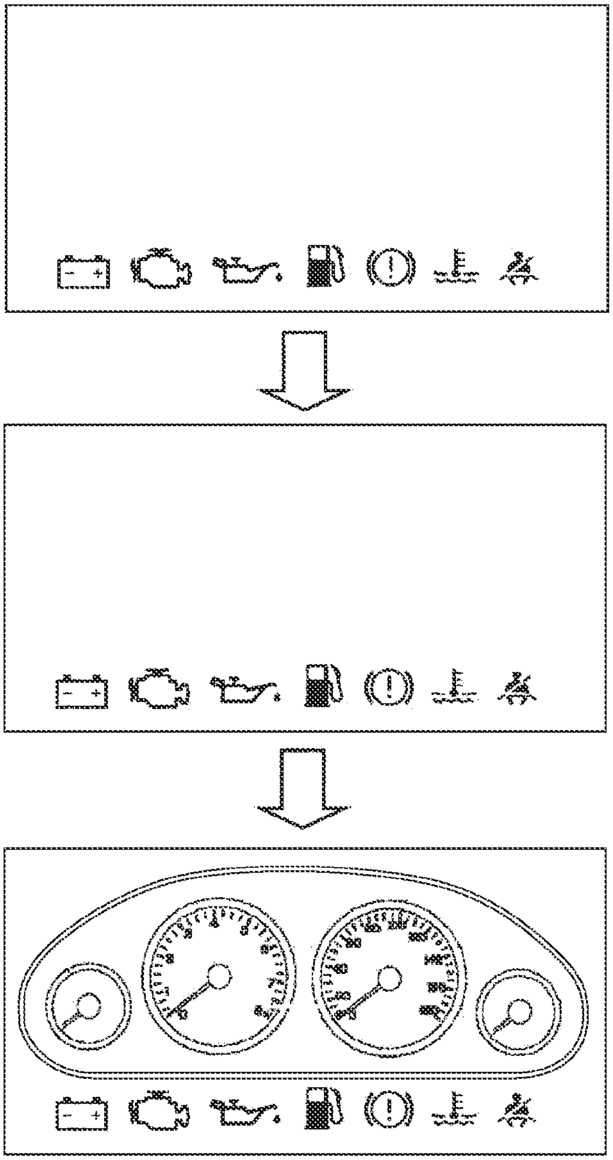
FIG. 4 is a diagram illustrating an example of transition of videos displayed on a display device.
Figure 5:
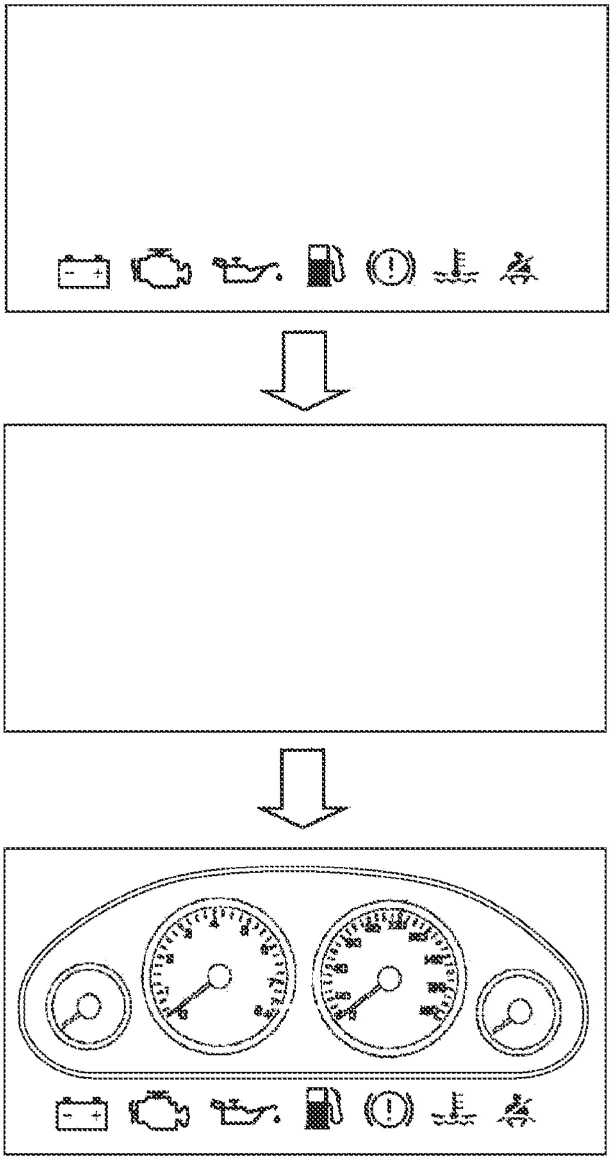
FIG. 5 is a diagram illustrating an example of transition of videos displayed on a display device in the related art.

According to the present embodiment configured in this manner, since only the OSD video is displayed and the external video is not displayed until the synchronization processing between the OSD video and the external video is completed, distortion of the videos does not occur. Also, according to the present embodiment, since the OSD video (the video of various warning lights) is consistently and continuously displayed as illustrated in FIG. 4, and the black screen is not inserted at a moment as a non-displayed state when the state where only the OSD video is displayed is switched to the state where the external video (the video of various meters) and the OSD video (the video of various warning lights) are displayed in a superimposed manner, flickering of the videos does not occur. According to the present embodiment, it is thus possible to prevent distortion and flickering of the videos from occurring when the superimposed video of the external video and the OSD video is displayed after the OSD video is displayed and switched therefrom. Also, according to the present embodiment, the synchronization processing is performed by adjusting the frame time length of the OSD video generated inside the display device 10, and it is thus not necessary to use a frame buffer (DRAM) that has been used in the related art to synchronize the external video input from the outside of the display device 10 with the OSD video.

Note that although the example in which whether to extend or shorten the blanking period is determined depending on how large the phase difference detected by the phase difference detection unit 14 is has been described in the above embodiment, the present disclosure is not limited thereto. For example, the amount of adjustment may be determined to extend the blanking period regardless of how large the phase difference detected by the phase difference detection unit 14 is. However, it is more preferable to consider the cases separately as in the above embodiment because it is possible to shorten the time required for the synchronization processing in a case where the phase difference is equal to or greater than 180 degrees.

Also, although the example in which the amount of adjustment of the length of the blanking period per frame is determined on the basis of the allowable time that can be set as the blanking period and the difference time corresponding to the phase difference detected by the phase difference detection unit 14 has been described in the above embodiment, the present disclosure is not limited thereto. For example, the amount of adjustment of the length of the blanking period may be set to a fixed value in advance within the allowable time range that can be set as the blanking period. In this case, the phase difference detection unit 14 uses whether or not the external video and the OSD video has been successfully synchronized (whether or not deviation therebetween has become less than a predetermined value) for checking for each frame. However, it is preferable to determine the amount of adjustment in accordance with the difference time corresponding to the phase difference as in the above embodiment because it is possible to shorten the time required for the synchronization processing.

Also, although the in-vehicle cluster display has been exemplified as an example of the display device 10 in the above embodiment, the present disclosure is not limited thereto. It is possible to apply the present disclosure to any display device with a function of displaying an external video and an OSD video in a superimposed manner.

Any of the above embodiments have been specifically exemplified in order to achieve the present disclosure. The technical scope of the present disclosure should not be limitedly interpreted with the embodiments. In other words, the present disclosure can be performed in various forms without departing from the main points or the main characteristics.

The invention claimed is:

1. A display device which displays a video comprising:

an external video processing unit configured to process an external video that is a video provided from outside of the display device;

an on-screen display (OSD) video generation unit configured to generate an OSD video;

a superimposed display unit configured to display the external video processed by the external video processing unit and the OSD video generated by the OSD video generation unit in a superimposed manner; and a phase difference detection unit configured to detect a phase difference between the external video generated by the external video processing unit and the OSD video generated by the OSD video generation unit;

wherein the OSD video generation unit executes synchronization processing of synchronizing the OSD video with a synchronization signal of the external video while outputting the OSD video to the superimposed display unit when the external video and the OSD video are displayed in a superimposed manner, where the external video processing unit is configured to not output the external video to the superimposed display unit during execution of the synchronization processing and to output the external video to the superimposed display unit after completion of the synchronization processing;

wherein the OSD video generation unit is configured to execute the synchronization processing by adjusting a length of a blanking period within an allowable time range that is able to be set as the blanking period; and wherein the OSD video generation unit is configured to determine an amount of adjustment of a length of a blanking period per frame and a number of frames to be used for the adjustment on a basis of the allowable time that is able to be set as the blanking period and a difference time corresponding to the phase difference detected by the phase difference detection unit.

2. The display device according to claim 1, wherein the OSD video generation unit is configured to determine the amount of adjustment to minimize the number of frames to be used for the synchronization processing within the allowable time range.

3. The display device according to claim 1, wherein:

the phase difference detection unit is configured to detect a phase difference between the external video and the OSD video for each of a horizontal direction and a vertical direction, and the OSD video generation unit is configured to determine a maximum value within an allowable time range that is able to be set as a horizontal blanking period as an amount of adjustment of a length of the horizontal blanking period and to determine an amount of adjustment of a length of a vertical blanking period within an allowable time range that is able to be set as the vertical blanking period.

4. The display device according to claim 1, wherein the OSD video generation unit is configured to determine the amount of adjustment such that the blanking period becomes long in a case where the phase difference detected by the phase difference detection unit is less than 180 degrees and to determine the amount of adjustment such that the blanking period becomes short in a case where the phase difference detected by the phase difference detection unit is equal to or greater than 180 degrees.

5. A display control method, comprising:

detecting, with a phase difference detection unit, a phase difference between an external video generated by an external video processing unit and an OSD video generated by an OSD video generation unit;

executing, with the OSD generating unit, synchronization processing of synchronizing the on-screen display (OSD) video with a synchronization signal of the external video while displaying the OSD video when the external video which is a video provided from outside of a display device and the OSD video generated inside the display device are displayed in a superimposed manner, not displaying the external video during execution of the synchronization processing, and displaying the external video and the OSD video in a superimposed manner after completion of the synchronization processing;

wherein executing the synchronization processing comprises:

adjusting, with the OSD video generation unit, a length of a blanking period within an allowable time range that is able to be set as the blanking period, where the OSD video generation unit determines an amount of adjustment of a length of a blanking period per frame and a number of frames to be used for the adjustment on a basis of the allowable time that is able to be set as the blanking period and a difference time corresponding to the phase difference detected by the phase difference detection unit.

* * * * *